United States Patent [19]
Santo

[11] 3,989,544
[45] Nov. 2, 1976

[54] QUICK DISCONNECT BATTERY

[76] Inventor: Charles P. Santo, 21643 Visnaw, St. Clair Shores, Mich. 48081

[22] Filed: July 28, 1975

[21] Appl. No.: 599,637

Related U.S. Application Data

[63] Continuation of Ser. No. 390,355, Aug. 22, 1973, abandoned.

[52] U.S. Cl. .................................. 429/65; 429/121
[51] Int. Cl.² ........................................ H01M 2/20
[58] Field of Search .................... 136/135, 181, 173

[56] References Cited
UNITED STATES PATENTS

| | | | |
|---|---|---|---|
| 2,159,042 | 5/1939 | Odell | 136/173 |
| 2,176,671 | 10/1939 | Huth | 136/173 |
| 2,225,460 | 12/1940 | Porth | 136/135 |
| 2,506,524 | 5/1950 | Stuck | 136/135 |

Primary Examiner—John H. Mack
Assistant Examiner—H. A. Feeley
Attorney, Agent, or Firm—Cullen, Settle, Sloman & Cantor

[57] ABSTRACT

In a lead acid or the like storage battery having a case and a plurality of cells with each cell having positive and negative plates. A first cell connector strap connects negative plates of one cell to the positive plates of an adjacent cell successively and terminates in a positive terminal connector upon the interior of the case. A second cell connector strap connects the positive plates of one cell with the negative plates of an adjacent cell successively and terminates in a negative terminal connector upon the interior of the case which has an apertured closure base. A platform is mountable upon a vehicle or other support and includes a pair of projecting terminal connectors adapted to be received and projected up into said case for respective connection with the positive and negative terminal connectors respectively. Mounted upon the platform is a connector adapted for connection to a ground and to a powerline respectively. A pair of conductors respectively interconnect the platform terminal connectors and said connector. The terminal connectors are so arranged and spaced relative to the battery connectors that upon mounting of the battery upon the platform, the platform connectors project up into and register within the battery connectors.

8 Claims, 4 Drawing Figures

QUICK DISCONNECT BATTERY

This is a continuation of application Ser. No. 390,355, filed Aug. 22, 1973, now abandoned.

BACKGROUND OF THE INVENTION

Heretofore, the conventional battery has provided upon the top surface of its case a positive and a negative terminal connector. As is conventional, the vehicle has a ground cable conventionally apertured for bolting over one terminal of the battery and a second power cable apertured to position over and be bolted to the second battery terminal. In this construction, various problems have arisen due to loosening of the cable connections. Corrosion at these connections impairs battery efficiency. Such connections require a tool to tighten the cable bolts.

Various efforts have been made to provide an improved connection between the battery and the vehicle such as shown in U.S. Pat. Nos. 1,519,701; 1,999,945; 2,159,042; 2,252,633; 3,261,719.

BRIEF DESCRIPTION OF THE INVENTION

It is an object of the present invention to provide an improved battery case wherein the positive and negative terminals instead of projecting upwardly and outwardly of the battery are constructed internally thereof and are completely enclosed by the battery case.

It is another object to provide a suitable platform adapted for mounting upon a vehicle or other support and secured thereto which includes a pair of upright terminals, one of which is connected to ground and the other of which is connected to the vehicle power system. In accordance with the present invention, when the battery case is lowered down upon the platform there is provided an automatic self-assembly and electrical connection between the platform terminals and the internal terminal sockets connected to the battery cells for completing the circuit to ground and to the power system. By this construction all the connectors are internal and protected against air and corrosion and the conventional cables and bolt assemblies are completely eliminated.

It is the further object of providing in those situations where a plurality of batteries are employed that there be mounted upon a suitable platform having the aforesaid sets of projecting terminals, of a corresponding series of batteries which are merely projected down upon the said platform with their internal terminal sockets in corresponding cooperative contact registry with the stationary terminal posts of the platform to thus complete by gravity and the weight of the batery a snug air-tight connection of the said posts upon the platform with the interior protected terminal sockets of the respective individual batteries.

These and other objects will be seen from the following specification and claims in conjunction with the appended drawings.

THE DRAWINGS

DETAILED DESCRIPTION OF THE INVENTION

It will be understood that the above drawings illustrate merely a preferred embodiment of the invention and that other embodiments are contemplated within the scope of the claims hereafter set forth. In the present construction all cables, clamps, bolts and nuts and projecting terminal post are eliminated.

Figure 2:
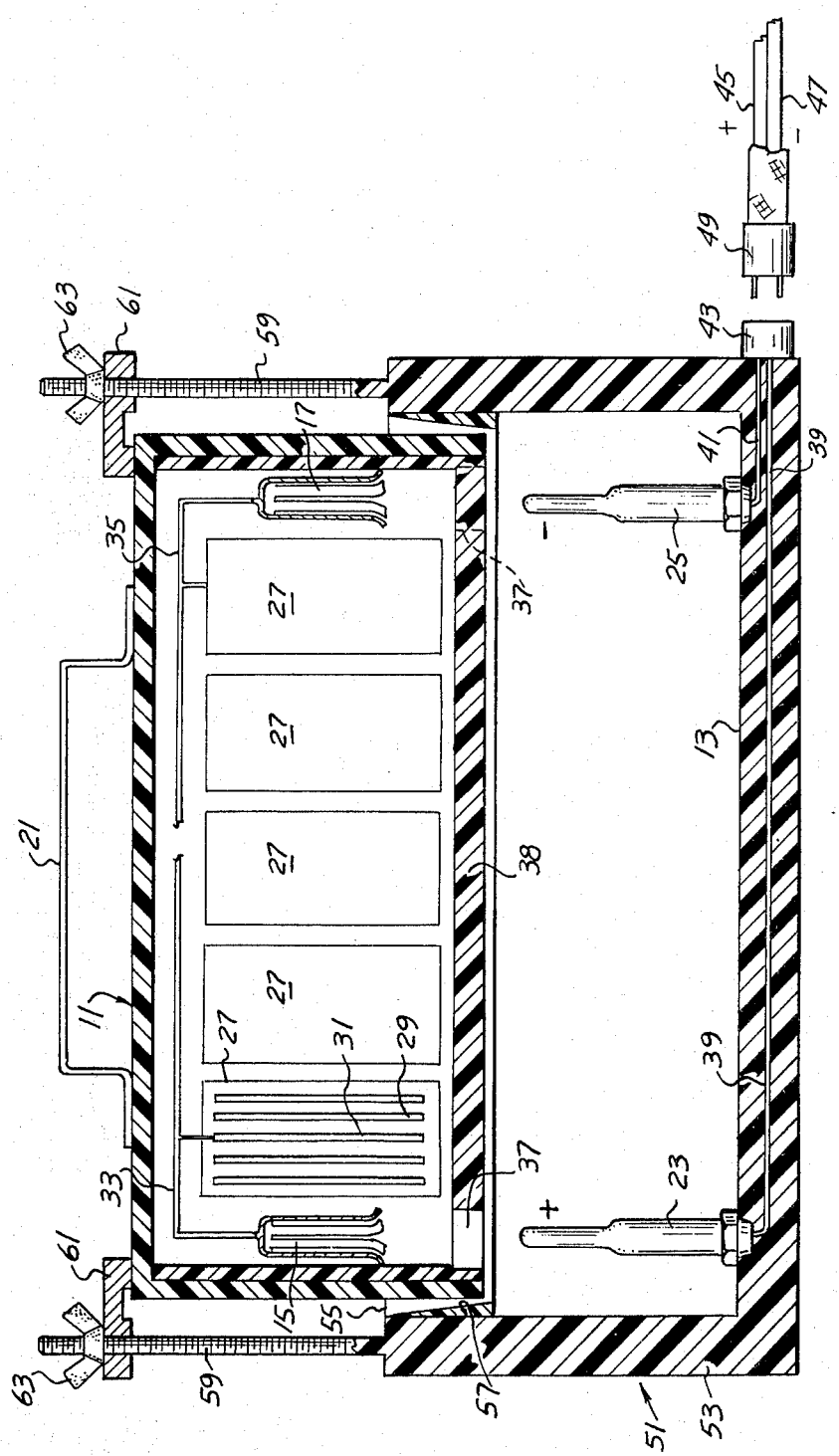
FIG. 2 is a vertical section on an increased scale of the present battery, partially assembled with said platform and a housing thereon.

Referring to the drawings, the storage battery A of a conventional construction is of the lead acid or like type of battery and includes case 11 adapted for vertical assembly and mounting by gravity upon platform 13 in the manner illustrated in FIG. 2. The battery includes a series of cells 27 each including alternately arranged and spaced positive plates 29 and negative plates 31 of conventional construction. Other types of battery are contemplated such as mercury, cadmium, etc.

In the illustrative embodiment the cell connector strap 33 extends between the respective cells and connects the negative plates 31 of one cell with the positive plates 29 of an adjacent cells successively and terminates at one end in the split resilient terminal socket 15 which is internal of the case 11. Said socket is axially aligned with aperture 37 in the base 38. Said socket could extend laterally if desired.

A second cell connector strap 35 connects the respective positive plates 29 to one cell with the negative plates 31 of an adjacent cell and successively between the respective cells and terminates in the negative internal split resilient depending terminal socket 17 within said case.

Handle 21 is secured to and overlies said case and provides a convenient means for lowering the battery down upon the support platform 13 anchored within a vehicle or other suitable support where the battery is being used.

Figure 1:
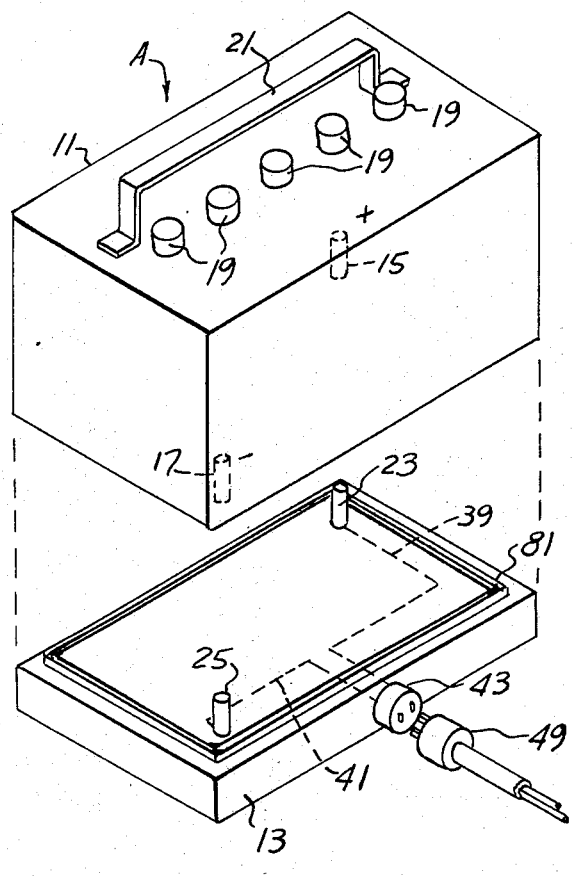
FIG. 1 is an exploded perspective view of the disassembled battery case and platform of the present invention.

As shown schematically in FIG. 1 and in FIG. 2, mounted upon the platform 13 is a positive terminal post 23 adapted for snug contact registry with the positive terminal socket 15. A negative terminal post 25 is mounted and so spaced upon platform 13 and with respect to terminal post 23 so as to cooperatively project within a corresponding bore in the base 38 when the battery is lowered onto said platform for resilient and frictional connection up within the corresponding split negative terminal post 17.

When the battery case is lowered so that its base 38 is in registry with said platform 13, FIG. 1, it cooperatively bears against the peripheral rubber or other resilient continuous bead 81 to provide an air-tight seal between said case and platform.

A suitable socket 43, FIGS. 1 and 2, is secured to said platform. A first connector wire 39 is mounted within or printed upon said platform and connects said socket with the positive terminal post 23. A second connector wire or other printed circuit element 41 is applied to said platform and interconnects the negative terminal post 25 with socket 43.

As a part of and connected to the vehicle, for example, is a suitable power cable 45, FIG. 2, as well as a ground cable 47 connected to the vehicle. Both cables terminate in the plug 49 having a pair of prongs adapted to nest within corresponding apertures within socket 43 as a sole means of connecting the platform and battery assembly to the vehicle.

While in the schematic illustration, FIG. 1, the battery case 11 is adapted for cooperative registry down and upon and over the platform 13, in FIG. 2 there is shown upon said platform a housing 51 having side walls 55 and end walls 53 adapted to receive and enclose the battery case when lowered by its handle onto said platform.

Suitable tapered guides 57 are applied to the respective side and end walls. Upon lowering of the battery onto the platform, the respective plus and negative connector posts 23 and 25 will register with and cooperatively extend up through the bores 37 in the base 38 and into cooperative frictional snug contact and registry within the respective positive and negative terminal sockets 15 and 17 within said case. Under some conditions, the battery case is held in place by the weight of the battery resting upon platform 13.

The battery may be nested and enclosed within housing 51 with suitable clamping means employed, such as shown in FIG. 2. In the present embodiment a pair of upright anchor studs 59 project from the end walls of the housing and are adapted to receive the apertured hold-down clamps 61 for anchoring the case down within the housing 51 employing fasteners 63.

Figure 4:
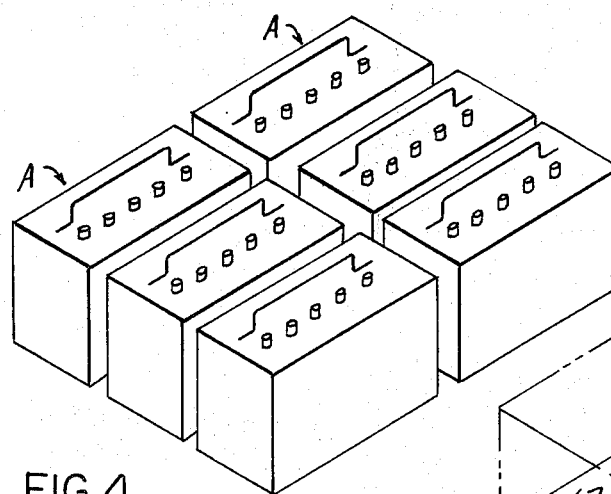
FIG. 4 is a perspective view of the batteries as they would be arranged when mounted upon the platform of FIG. 3.
Figure 3:
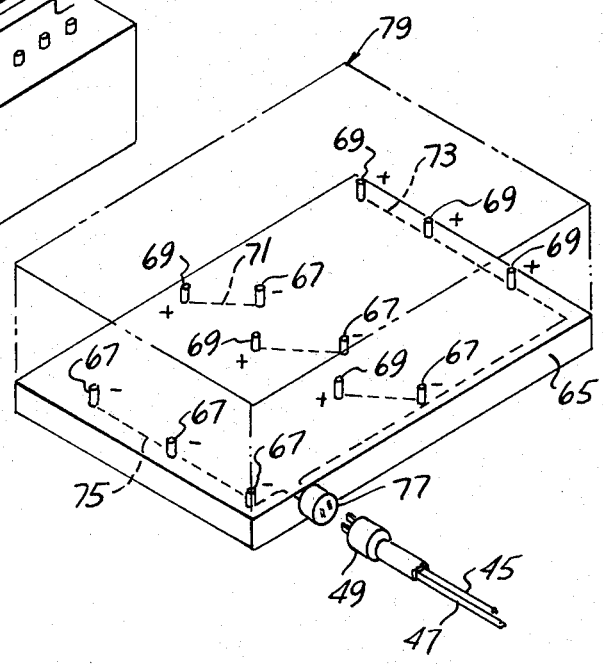
FIG. 3 is a perspective view of a modified platform adapted to receive a series of said batteries.

FIGS. 3 and 4 illustrate schematically a further adaptation of the present invention, wherein a series of batteries similar to battery A may be employed such as for powering an electric motor for a vehicle. The unsightly cumbersome and space wasting cables, clamps and connectors are eliminated. This provides a clean and neat mounting of the respective batteries in FIG. 4 down upon platform 65, FIG. 3. A suitable protective casing 79 bears on said platform.

Platform 65 is mountable upon a vehicle or other suitable support which will use the series of batteries shown in FIG. 4, for illustration.

These batteries will be of the same construction of that described with respect to FIGS. 1 and 2. Corresponding to the respective batteries of FIG. 4 there will be provided upon said platform a corresponding series of spaced and properly located upright pairs of terminal posts 67 and 69 corresponding to the terminal posts 23 and 25, FIG. 1, and arranged in sets.

A single outlet socket 77 is secured to platform 65, FIG. 3. The lead wire, or suitable connector or printed circuit 73 extends between and connects the positive terminal posts 69 with socket 77. A second lead or wire or printed circuit element 75 connects the negative terminal posts 67 with said socket.

In view of the multiple batteries involved, there may be some additional connectors 71 to interconnect terminal posts 67 with the adjacent terminal posts 69 to thus provide a complete circuit to socket 77. There is provided a plug 49 with associated cable 45 for power and a ground cable 47 adapted for assembly to socket 77.

As shown in FIG. 3 there is schematically illustrated the protective casing 79 which rests upon platform 65 and completely encloses the assembled batteries.

One terminal post 23 and corresponding terminal socket 15 may be round in shape and the corresponding terminal post 25 and socket 17 will be square in shape, to assure that the battery is correctly assembled upon the platform.

Essentially there is provided an improved lead acid or the like storage battery wherein the positive and negative terminal sockets are arranged completely within the battery case and protectively enclosed thereby. There are no projections on the battery such as in the conventional battery having upstanding terminal posts.

While the internal terminal sockets could extend in any direction, in the illustrative embodiment they extend downward for registry with corresponding bores 37 in the base 38 of the casing. When the battery case 11 is lowered down upon the platform 13, FIG. 2, for registry therewith, the corresponding upright positive and negative terminal posts 23 and 25 automatically project up through the bores 37 for cooperative snug frictional contact and registry within the corresponding split terminal sockets 15 and 17.

In the illustrative form of the sockets at 15 and 17, these are shown as having a series of longitudinal slits to provide a tight resilient contact with terminal posts 23 and 25.

With the platform 13 already mounted upon a vehicle or other support, the battery A as in FIG. 2 or a series of batteries as in FIG. 4 are manually positioned down upon the platform 13 or the platform 65 with the respective sockets 15 and 17 of the individual batteries automatically registering and establishing a proper electrical connection with the corresponding posts 23-25 FIG. 2, or the terminal posts 67-69 respectively on platform 65, FIG. 3.

The electrical connection established is completely internal of case 11 and is essentially air-tight, in view of the seal 81, FIG. 1. This prevents corrosion at the connections of said post and sockets.

In the present construction, the conventional battery terminal posts are eliminated as are the conventional cables, clamps, bolts and nuts. The connection is automatic. No tool is needed.

Having described my invention, reference should now be had to the following claims.

I claim:

1. In a storage battery of the wet cell type having a hollow case and a plurality of separately enclosed wet cells therein, with each wet cell having internal positive and negative plates, and conventional connector means extending between adjacent wet cells to connect all the wet cells together, the improvement comprising:
   a closure base on said hollow case;
   said conventional connector means including a first connector strap extending from a wet cell and terminating in a positive terminal socket inwardly of said hollow case and externally of all said wet cells and spaced apart from said closure base;
   said conventional connector means including a second connector strap extending from a wet cell and terminating in a negative terminal socket inwardly of said hollow case and externally of all said wet cells and spaced apart from said closure base; and
   a pair of bores in said closure base, each bore in axial registry with one of said terminal sockets, each bore adapted to receive a terminal post therethrough so that the terminal posts may fit snugly into said sockets interiorly of said hollow case and exteriorly of said wet cells.

2. The invention of claim 1, wherein each of said sockets being longitudinally slit and resilient to snugly releasably receive a terminal post.

3. The invention of claim 1, wherein said sockets open downwardly, and further including a platform adapted for mounting upon a vehicle, a pair of spaced upright terminal posts secured upon and projecting above said platform; a connector on the platform; and a pair of conductors respectively interconnecting said terminal posts and connector; said posts being arranged and spaced so as to project up through said battery closure base snugly into the respective terminal sockets when said battery case is mounted upon said platform.

4. The invention of claim 3, and further including a casing having side walls and end walls overlying and secured to said platform, said casing adapted to receive said battery.

5. The invention of claim 3, and further including a casing having side and end wall overlying and secured to said platform adapted to receive said batteru; and a hold down clamp means anchoring said battery case upon said platform within said casing.

6. The invention of claim 5 and futher including downwardly and inwardly inclined tapered guides on the interior of the casing side and end walls to facilitate the downward assembly of the battery with the platform terminal posts projected into snug contact within the terminal sockets.

7. The invention as defined in claim 3, wherein said platform includes a series of spaced pairs of upright terminal posts secured upon and projecting above said platform; and, wherein said pair of conductors respectively connects all of said terminal posts to said connector.

8. In combination, a storage battery of the wet cell type having a hollow case and a plurality of separately enclosed wet cells therein, with each wet cell having internal positive and negative plates, and conventional connector means extending between adjacent wet cells to connect all the wet cells together, the improvement comprising:

a closure base on said hollow case;

said conventional connector means including a first connector strap extending from a wet cell and terminating in a positive terminal socket inwardly of said hollow case and externally of all said wet cells and spaced apart from said closure base;

said conventional connector means including a second connector strap extending from a wet cell and terminating in a negative terminal socket inwardly of said hollow case and externally of all said wet cells and spaced apart from said closure base;

a pair of bores in said closure base, each bore in axial registry with one of said terminal sockets;

a platform adapted for mounting upon a vehicle, a pair of spaced apart terminal posts secured to and extending upwardly from said platform, said posts extending upwardly through said bores and snugly engaged in said terminal sockets;

a casing having side and end walls overlying and secured to said platform; and a hold down clamp means anchoring said battery case upon said platform within said casing.

* * * * *